(12) United States Patent
Mallinowski

(10) Patent No.: US 12,228,211 B2
(45) Date of Patent: Feb. 18, 2025

(54) DIRECTIONAL CONTROL VALVE AND METHOD FOR SETTING CONNECTIONS

(71) Applicant: Ivan Mallinowski, Wassenberg (DE)

(72) Inventor: Ivan Mallinowski, Wassenberg (DE)

( * ) Notice: Subject to any disclaimer, the term of this patent is extended or adjusted under 35 U.S.C. 154(b) by 394 days.

(21) Appl. No.: 17/713,780

(22) Filed: Apr. 5, 2022

(65) Prior Publication Data
US 2022/0299123 A1  Sep. 22, 2022

Related U.S. Application Data (63) Continuation of application No. PCT/EP2020/078598, filed on Oct. 12, 2020.

(30) Foreign Application Priority Data

Oct. 11, 2019  (DE) .......................... 102019127414.1

(51) Int. Cl.
| | |
|---|---|
| *F24F 13/02* | (2006.01) |
| *F16K 11/074* | (2006.01) |
| *F24F 7/04* | (2006.01) |
| *F24F 11/00* | (2018.01) |
| *F24F 13/08* | (2006.01) |
| *F24F 13/10* | (2006.01) |
| *F24F 13/12* | (2006.01) |

(52) U.S. Cl.
CPC ............ *F16K 11/074* (2013.01); *F24F 13/12* (2013.01); *F24F 2203/02* (2013.01)

(58) Field of Classification Search
CPC ........... F24F 2007/001; F24F 2007/005; F24F 7/007; F24F 7/04; F24F 7/06; F24F 7/08; F24F 11/0001; F24F 12/001; F24F 2012/008; F24F 13/02; F24F 13/08; F24F 13/10; F24F 13/105; F24F 13/12; F24F 13/16
See application file for complete search history.

(56) References Cited

U.S. PATENT DOCUMENTS

| | | | | |
|---|---|---|---|---|
| 2,388,890 | A * | 11/1945 | Whitted | F24F 13/10 137/625.43 |
| 5,117,655 | A * | 6/1992 | Anderson | F28D 11/02 165/92 |
| 6,240,735 | B1* | 6/2001 | Kolson | F16K 5/0414 165/294 |

(Continued)

FOREIGN PATENT DOCUMENTS

| | | |
|---|---|---|
| CN | 110206916 A | 9/2019 |
| EP | 2634500 A2 | 9/2013 |

*Primary Examiner* — Frantz F Jules
*Assistant Examiner* — Jason N Thompson
(74) *Attorney, Agent, or Firm* — Von Rohrscheidt Patents (57) ABSTRACT

A directional control valve including air connections for exhaust air, feed air, outside air and waste air; two respective functional connections of a heating path and a cooling path; a switching element that is configured to connect each of the air connections with exactly one of the functional connections so that the exhaust air is fed back through the heating path as the feed air in a heating position, and the exhaust air fed back through the cooling path as the intake air in a cooling position, and the outside air is fed through the heating path in a winter ventilation position as the feed air, and the outside air is fed through the cooling path in a summer ventilation position as the feed air.

8 Claims, 7 Drawing Sheets

(56) References Cited

U.S. PATENT DOCUMENTS

| | | | |
|---|---|---|---|
| 2003/0102106 A1* | 6/2003 | Moilala | F24F 3/1411 |
| | | | 165/4 |
| 2005/0011218 A1* | 1/2005 | Pearson | F24F 13/10 |
| | | | 454/286 |
| 2008/0017347 A1* | 1/2008 | Chung | F24F 12/001 |
| | | | 165/4 |
| 2016/0348797 A1* | 12/2016 | Larsson | F24D 19/1024 |
| 2018/0274810 A1* | 9/2018 | Woods | F24F 11/79 |

* cited by examiner

DIRECTIONAL CONTROL VALVE AND METHOD FOR SETTING CONNECTIONS

RELATED APPLICATIONS

This application is a continuation of International Patent application PCT/EP2020/078598 filed on Oct. 12, 2020 claiming priority from German Patent Application DE 10 2019 127 414.1 filed on Oct. 11, 2019, both of which are incorporated in their entirety by this reference.

FIELD OF THE INVENTION

The invention relates to a directional control valve and a method for controlling connections between air connections.

BACKGROUND OF THE INVENTION

Directional control valves (DCV) open and close fluid connections, e.g., in the field of heating and air conditioning for air flows by moving a single switching element (8) into one of plural discrete switching positions.

Methods of the generic type recited supra are used for selecting one of four discrete operating modes of a heating and air conditioning system for an interior of a building, wherein Exhaust air is drawn from the interior space,
Feed air is fed into the interior space,
Outside air is drawn from the ambient, and
Waste air is discharged into the ambient.
There are four operating modes:
Heating, wherein exhaust air is heated in the heating path and fed back as feed air,
Cooling, wherein the exhaust air dissipates heat in the cooling path and is fed back as feed air,
Winter ventilation, wherein outside air is heated in the heating path and fed as feed air, and
Summer ventilation, wherein the outside air is cooled in the cooling path and fed as feed air.

Methods using flaps and/or slides arranged in air ducts are well known. Combinations of heat pumps and heat accumulators are well known for supplying habitation units with hot water.

BRIEF SUMMARY OF THE INVENTION

Thus, it is an object of the invention to simplify controlled heating, air conditioning and ventilation for interior spaces.

The invention proposes directional control valve, comprising: air connections for exhaust air, feed air, outside air and waste air; two respective functional connections of a heating path and a cooling path; a switching element that is configured to connect each of the air connections with exactly one of the functional connections so that the exhaust air is fed back through the heating path as the feed air in a heating position, and the exhaust air fed back through the cooling path as the intake air in a cooling position, and the outside air is fed through the heating path in a winter ventilation position as the feed air, and the outside air is fed through the cooling path in a summer ventilation position as the feed air.

Directional control valves are designated according to a number of connections per switching position and a number of switching positions so that the directional control valve is designated as an 8/4 directional control valve. The directional control valve according to the invention facilitates selecting an operating mode for controlled interior space heating air conditioning and ventilation by adjusting a single switching element.

Advantageously, the switching element in the directional control valve according to the invention is disk shaped and includes cutouts, wherein the air connections are connected through the cutouts with the functional connections. The directional control valve according to the invention can include the air connections and the functional connections respectively in disc shaped subassemblies that are arranged above and below the switching element. Assembling or disassembling and thus maintaining and cleaning the directional control valve according to the invention is thus facilitated.

Since the directional control valve according to the invention only includes a single moving part, it is much less failure prone compared to known flap systems. Malfunctions caused by a failure or incomplete opening or closing of induvial flaps do not occur.

Advantageously, the switching element according to the invention is arranged in the directional control valve according to the invention pivotable about an axis. Air connections and functional connections that are associated with one another and the respective cutouts of the switching element can then be arranged in concentric circles about the axis.

Advantageously, the cutouts to the air connections for exhaust air and feed air in the directional control valve according to the invention are arranged in a first circular ring and the air connections for outside air and waste air are arranged in a second circular ring radially offset from the first circular ring and/or the functional connections of the heating path and the cooling path are arranged in separate circular rings about the axis.

Advantageously, a directional control valve according to the invention includes in particular an electric drive for the switching element. The drive facilitates adjusting the switching element.

Advantageously a directional control valve according to the invention includes a control for the drive, the control facilitates an automatic selection of a switching position of a switching element based on an external parameter e.g., a time of the day or in particular a temperature or humidity measured at one of the air connections or based on a combination of several parameters of this type.

Advantageously, a directional control valve according to the invention includes additional air connections for additional feed air and/or exhaust air. A directional control valve according to the invention then facilitates selecting between different feed and/or exhaust air flows. In particular, a directional control valve according to the invention can be operated as a proportional valve which determines portions of the incoming and outgoing air flows through the position of the switching element.

Advantageously, a new device for controlling a temperature of an interior space of a building with a heat storage device includes a directional control valve according to the invention wherein the heat pump is arranged in the cooling path. A device of this type according to the invention uses heat from the outside air or excess heat from the exhaust air. Advantageously the heat pump puts heat into the heating path in the device according to the invention.

Advantageously a device according to the invention includes a heat exchanger that exchanges heat between exhaust air and outside air. In this embodiment the heat pump is only required to utilize residual heat that remains in a respectively warmer air flow downstream of the heat exchanger.

Advantageously, a device according to the invention includes a heat accumulator wherein the heat pump charges the heat accumulator and the heat pump and/or the heat accumulator releases the heat into the heating path. In the device according to the invention the heat accumulator can buffer the heat recovered by the heat pump and not immediately absorbed in the heating path so that the heat accumulator can transfer the heat to the waste air or to the feed air at a predetermined point in time.

As an alternative to buffering in a heat accumulator heat from the heat pump can be transferred to the heating path through a heat exchanger in particular through a reverse flow heat exchanger in the device according to the invention.

Advantageously, a device according to the invention includes a fan in the heating path and/or in the cooling path. These fans facilitate fine adjustment of the heating and cooling power.

Improving upon the known method it is proposed according to the invention that the connections are controlled by selecting switching positions of a directional control valve between the air connections and the functional connections on the other side. The method according to the invention is performed by a directional control valve according to the invention and yields the same advantages described supra regarding the device according to the invention.

BRIEF DESCRIPTION OF THE DRAWINGS

The invention is subsequently described based on embodiments with reference to drawing figures, wherein:

FIG. 2 B illustrates the directional control valve in an exploded view;

DETAILED DESCRIPTION OF THE INVENTION

Figure 1:
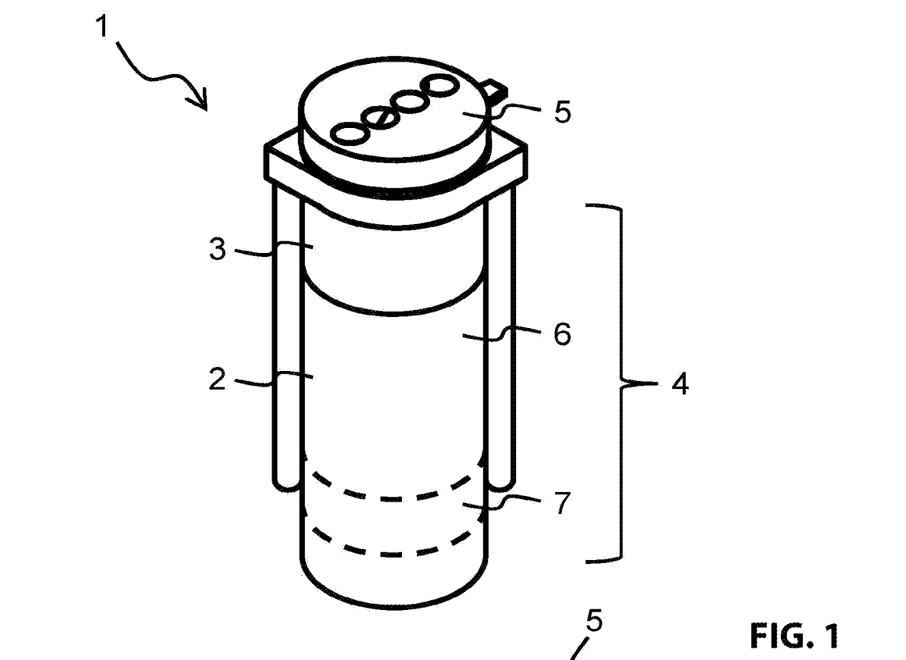
FIG. 1 illustrates a device according to the invention

The device 1 illustrated in FIG. 1 is used for controlling a temperature in an interior space of a building. The device 1 includes a heat accumulator 2 and a heat pump 3 which is configured as an essentially cylindrical unit 4 that functions as a wash water heat pump and is available from the Danish manufacturer Vesttherm under the product designation VT3130 and a directional control valve 5 according to the invention. The jacket 6 of the heat accumulator 2 includes a heating path 7 connected in parallel with the heating element of the heat pump 3 wherein the heating path 7 heats the water in the heat accumulator 2.

The air conduits to the heat pump 3 and to the heating path 7 include fans. The fan in the heating path 7 controls the portions of the heat which are transferred by the heat pump directly into the heating path 7 and into the heat accumulator 2.

Figure 2A:
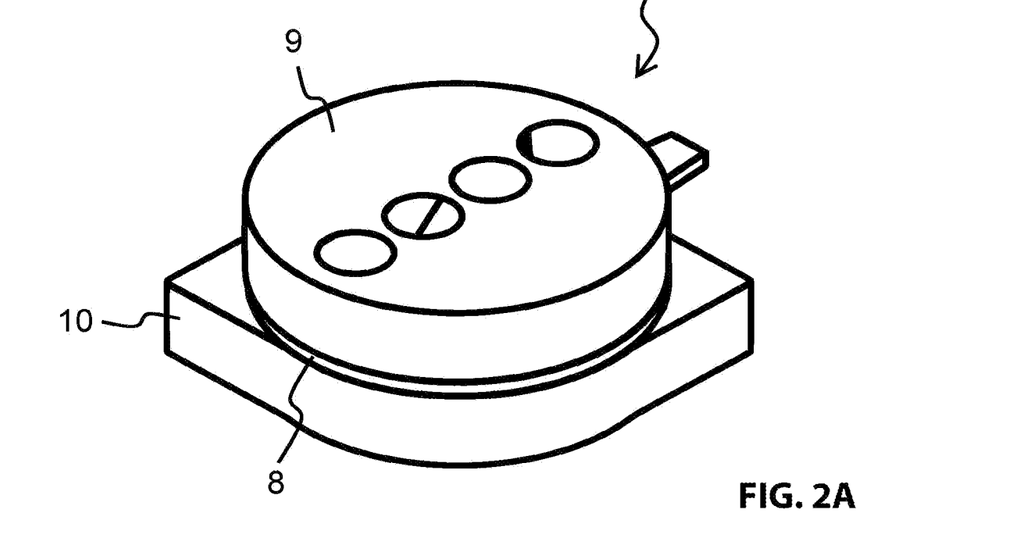
FIG. 2A illustrates a directional control valve according to the invention of the device according to the invention.
Figure 2B:
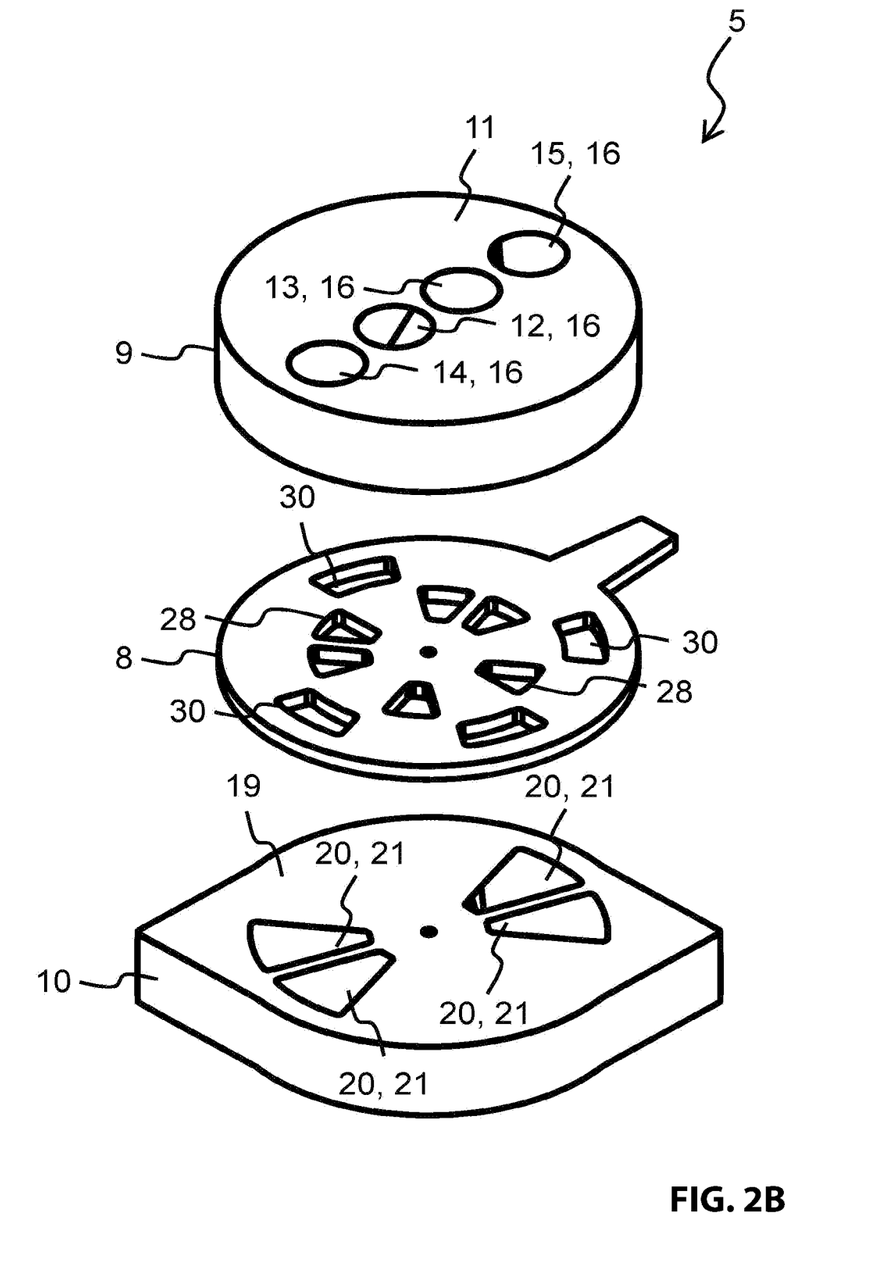

The directional control valve 5 according to the invention illustrated in detail in FIGS. 2A and 2B includes a disk-shaped switching element 8 and a top disk 9 arranged there above and a base disk 10 arranged below the switching element 8.

Figure 3A:
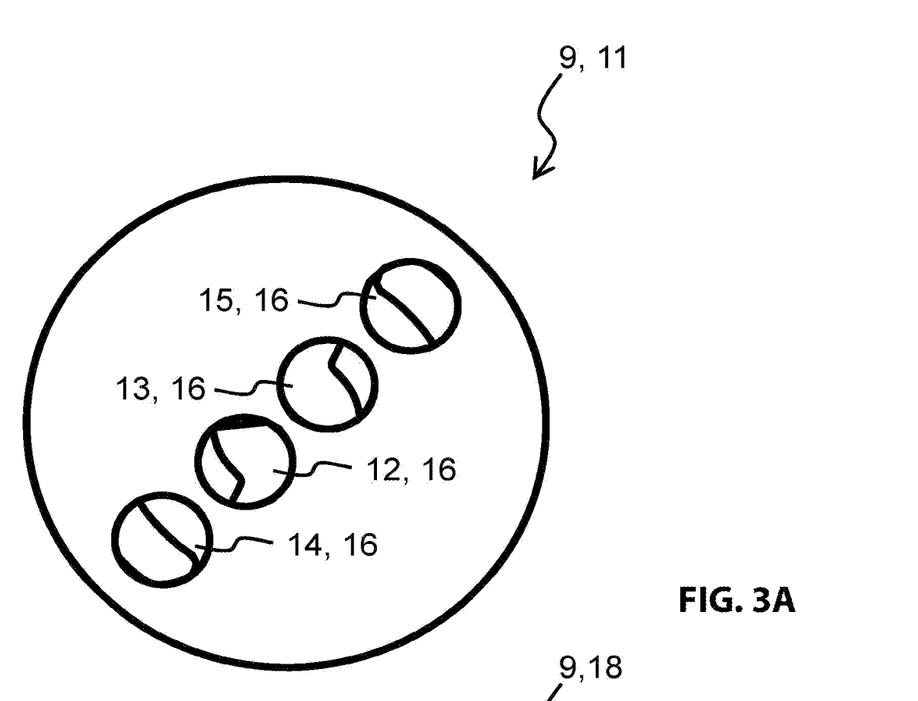
FIGS. 3A/B illustrates a top disk direction of the control valve.
Figure 3B:
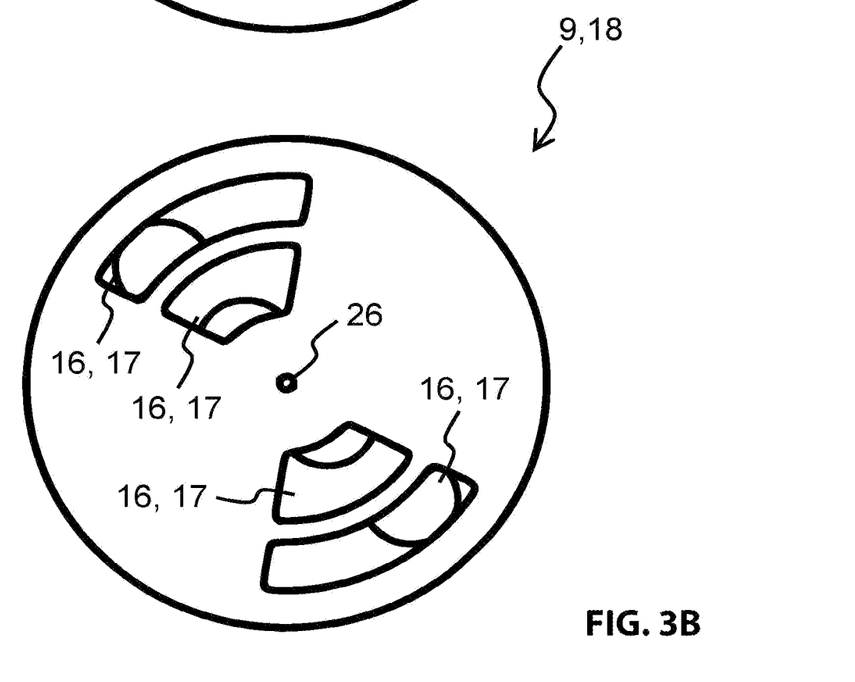

The circular top disk 9 illustrated in FIGS. 3A and 3B includes four air connections 12, 13, 14, 15 for exhaust air from a non-illustrated interior of a building, for feed air going into the interior, for outside air from an ambient of the building and for waste air going into the ambient. Channels 16 formed in the top disk 9 lead from the air connections 12, 13, 14, 15 to circular segment shaped openings 17 at a bottom side 18 of the top disk 9.

Figure 4A:
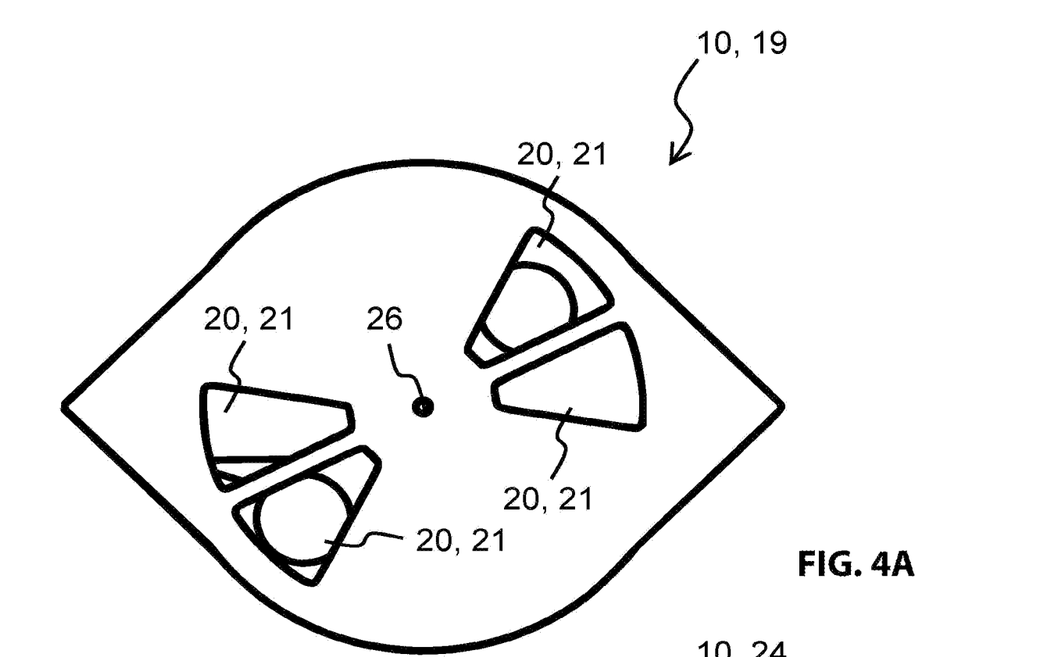
FIG. 4A/B illustrates a base disk of the directional control valve according to the invention respectively in a top view and in a bottom view.
Figure 4B:
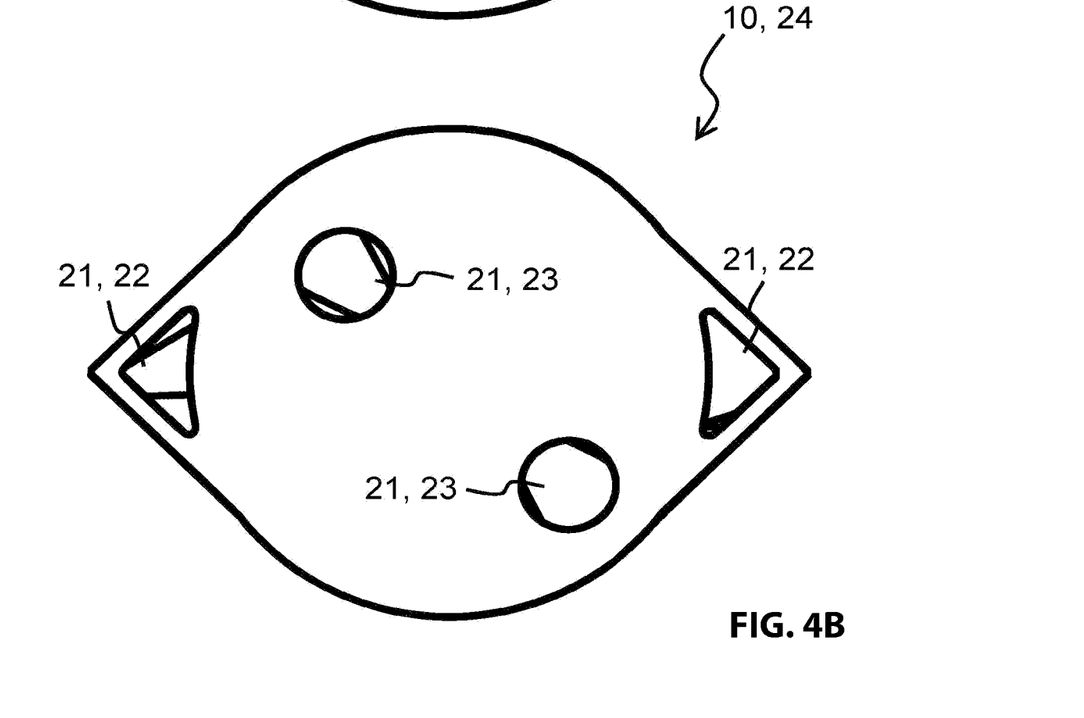

As illustrated in detail in FIGS. 4A and 4B the essentially circular base disk 10 includes four circular segment shaped openings 20 at a top side 19 wherein the openings 20 lead through channels 21 formed in the base disk 10 into two functional connections 22 for the heating path 7 and two other functional connections 23 at a bottom side 24 of the base disk 10 for the cooling path 25 through the heat pump 3.

In an assembled condition of the directional control valve 5 the openings 17 are arranged at the bottom side 18 of the top disk 9 above openings at the top side 19 of the base disk 10 and the essentially circular switching elements 8 is arranged between the top disk 9 and the base disk 10. A position of the top disk 9 and the base disk 10 relative to each other is fixed whereas the switching element 8 is pivotable about a center axis 26 of the directional control valve 5.

Figures 5, 6:
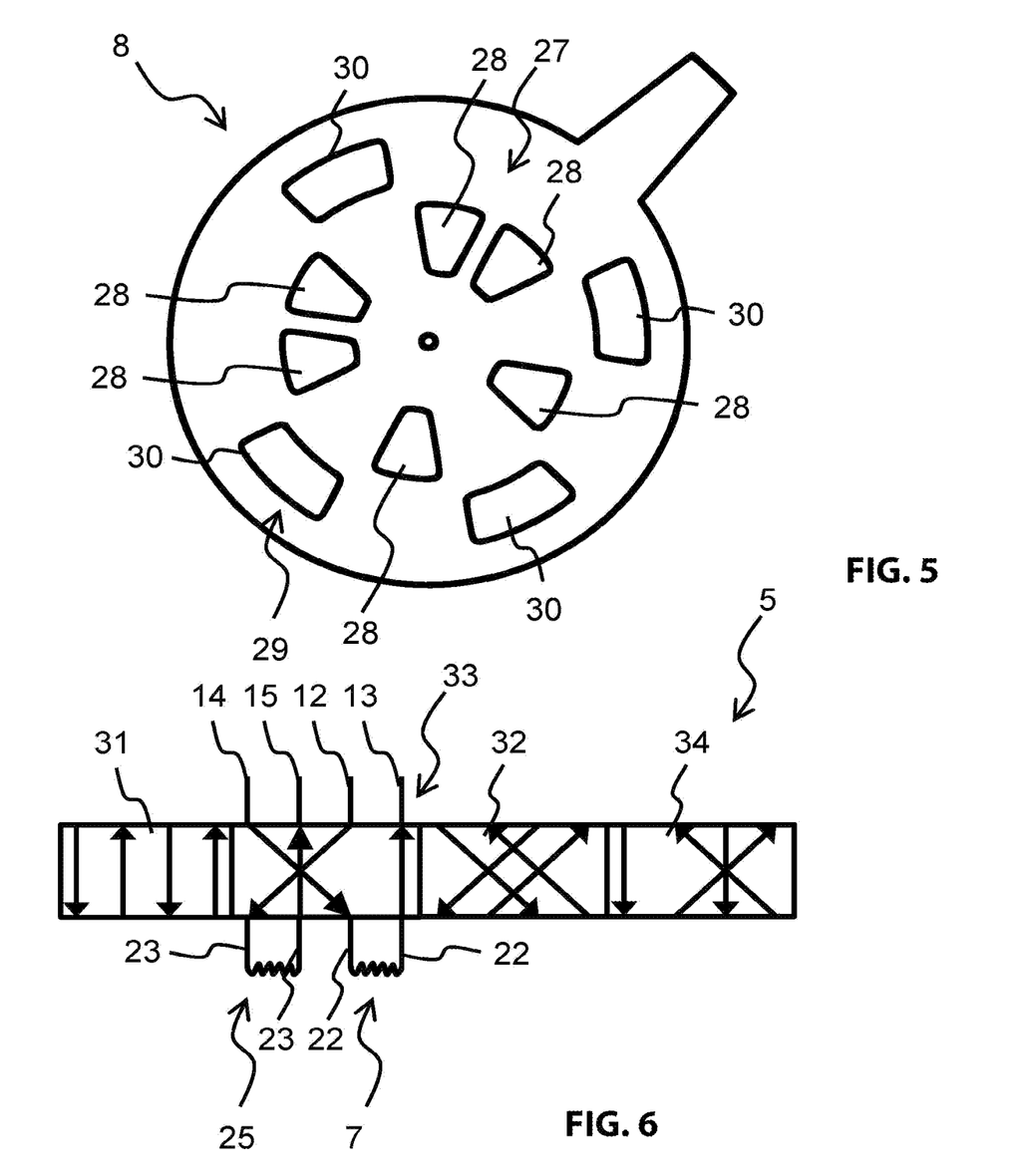
FIG. 5 illustrates the switching element of the directional control valve.
FIG. 6 illustrates a switching diagram of the directional control valve.

The switching element 8 shown in detail in FIG. 5 includes six cutouts 28 arranged in an inner circular ring 27 about the center axis 26 wherein the air connections 12, 13 for exhaust air and feed air can be connected through the six cutouts 28 and through functional connections 22, 23 optionally with the heating path 7 or the cooling path 25. The switching element 8 includes four additional cutouts 30 arranged in an outer circular ring 29 about the axis 26 wherein the air connections 14, 15 for the outside air and the waste air are connected through the four additional cutouts 30 and through the functional connections 22, 23 optionally with the heating path 7 or the cooling path 25.

Figure 6A:
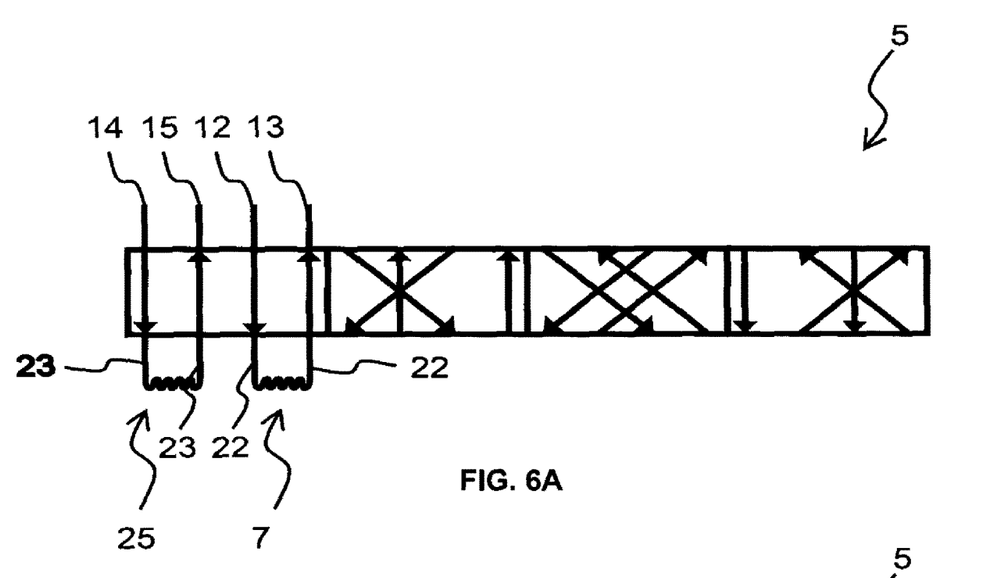
FIG. 6A illustrates the directional control valve in a heating position.
Figure 6B:
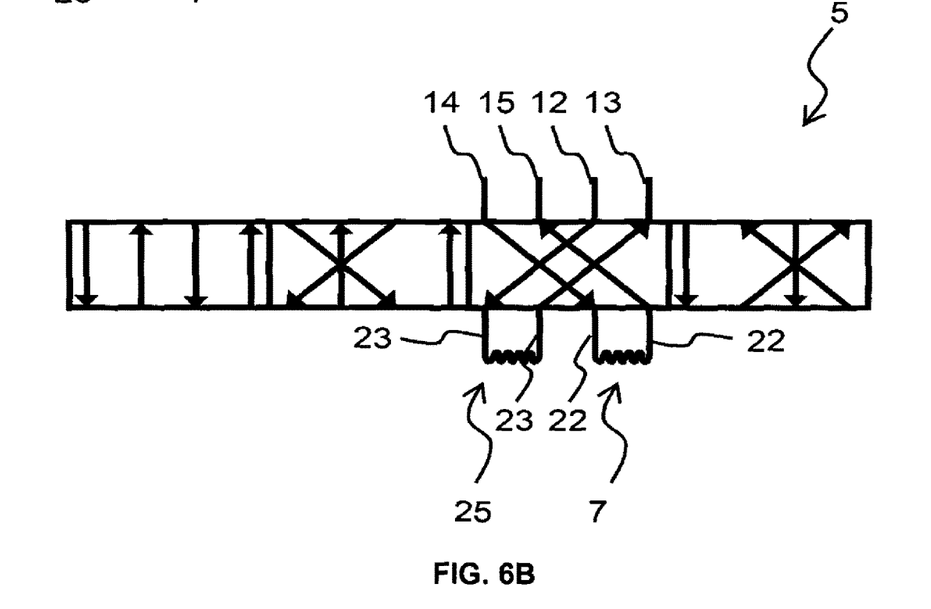
FIG. 6B illustrates the directional control valve in a cooling position.
Figure 6C:
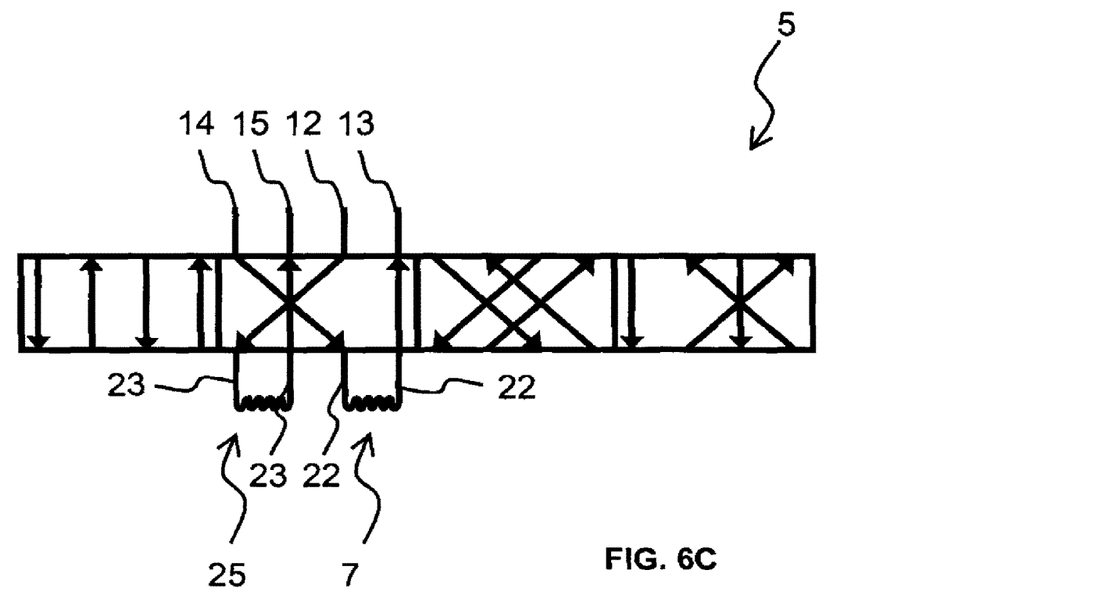
FIG. 6C illustrates the directional control valve in a winter ventilation position.
Figure 6D:
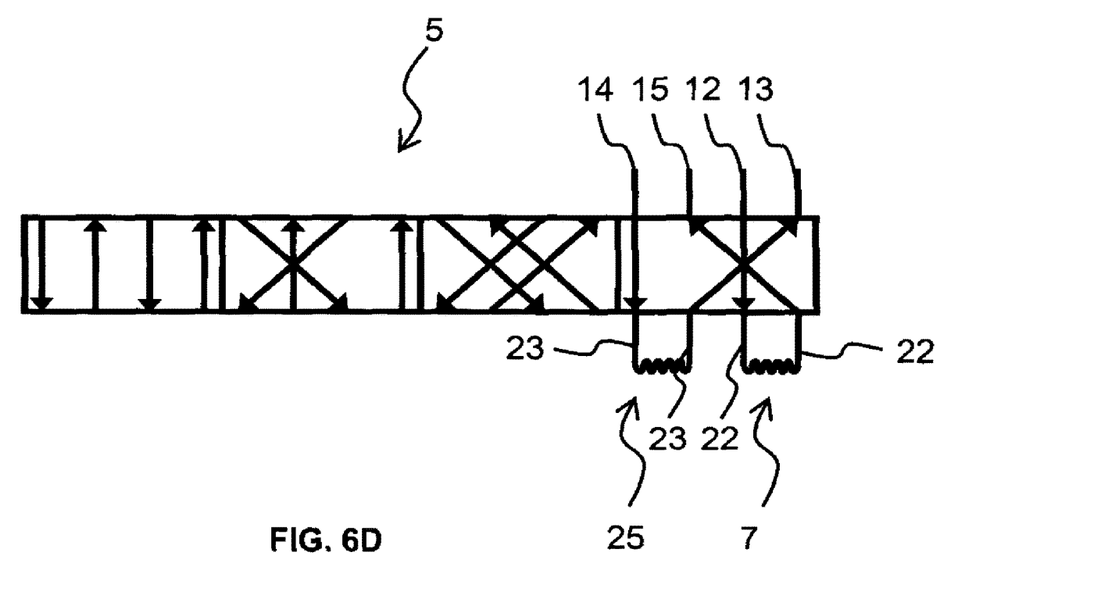
FIG. 6D illustrates the directional control valve in a summer ventilation position.

FIG. 6A illustrates the directional control valve 5 in the heating position 31. FIG. 6B illustrates the directional control valve 5 in the cooling position 32. FIG. 6C illustrates the directional control valve 5 in the winter ventilation position 33; and FIG. 6D illustrates the directional control valve 5 in the summer ventilation position 34.

In the heating position 31 the exhaust air absorbs heat from the heat accumulator 2 in the heating path 7 and is fed back into the interior as feed air. The outside air transfers heat in the cooling path 25 through the heat pump 3 to the heat accumulator 2 and is discharged as waste air.

In the cooling position 32 the exhaust air transfers heat in the cooling path 25 through the heat pump 3 to the heat accumulator 2 and is fed back as feed air. The outside air absorbs excess heat from the heat accumulator 2 in the heating path 7 and is discharged as waste air.

In the winter ventilation position 33, the outside air absorbs heat from the heat accumulator 2 in the heating path 7 and is introduced into the interior space as feed air. The exhaust air transfers heat to the heat accumulator 2 in the cooling path 25 through the heat pump 3 and is discharged to the ambient as waste air.

In the summer ventilation position 34 the outside air transfers heat in the cooling path 25 through the heat pump 3 to the heat accumulator 2 and is fed into the interior space as feed air. The exhaust air absorbs excessive heat in the heating path 7 from the heat accumulator 2 and is discharged as waste air.

The switching element 8 is pivotable by an electric drive about the axis 26 into the heating position 31, the cooling position 32, the winter ventilation position 33 and the summer ventilation position 34. The drive and the fans are connected with a control for controlled ventilation of the interior space, wherein the control determines the switching position of the directional control valve 8 and a speed of the fans according to a temperature and humidity of the exhaust air and of the ambient air automatically.

By incomplete approximation of the position of the switch element 8 to the heating position 31, the cooling position, 32 the winter ventilation position 33 of the summer ventilation position 34, the openings 17 of the top disc 9 can be opened partially relative to the respective openings 20 of the base disc 10 which controls the respective air flows proportional to a position of the switch element 8.

A second embodiment of the device according to the invention substantially corresponds to first embodiment of the device 1 according to the invention, however respectively includes an additional air connection for exhaust air and feed air. The second embodiment of the device according to the invention is particularly suitable for a ventilation of an additional interior space, a living space and additionally a bathroom with a shower that is air separated from the living space, advantageously respectively in the winter ventilation position and in the summer ventilation position.

REFERENCE NUMERALS AND DESIGNATIONS 1 device
2 heat accumulator
3 heat pump
4 sub assembly
5 directional control valve
6 jacket
7' heating path
8 switching element
9 top disc
10 base disc
11 top side of top disc
12 exhaust air connection
13 feed air connection
14 outside air connection
15 waste air connection
16 channel in top disc
17 opening in bottom side of top disc
18 bottom side of top disc
19 top side of base disc
20 opening in top side of base disc
21 channel in base disc
22 functional connection to heating path
23 functional connection to cooling path
24 bottom side of base disc
25 cooling path
26 axis
27 inner circular ring
28 cut out in switching element
29 outer circular ring
30 cut out
31 heating position
32 cooling position
33 winter ventilation position
34 summer ventilation position

What is claimed is:

1. A directional control valve, comprising:
an exhaust air port for exhaust air;
a feed air port for feed air;
an outside air port for outside air;
a waste air port for waste air;
two heating paths ports;
two cooling path ports;
a switching element that is configured to connect each of the exhaust air port, the feed air port, the outside air port, and the waste air port with exactly one of the two heating paths ports and the two cooling path ports,
so that
the exhaust air port is connected with a first heating path port of the two heating path ports and the feed air port is connected with a second heating path port of the two heating path ports in a heating position of the switching element,
the exhaust air port is connected with a first cooling path port of the two cooling path ports and the feed air port is connected with a second cooling path port of the two cooling path ports in a cooling position of the switching element,
the outside air port is connected with a first heating path port of the two heating path ports and the feed air port is connected with a second heating path port of the two heating path ports in a winter ventilation position of the switching element,
the outside air port is connected with a first cooling path port of the two cooling path ports and the feed air port is connected with a second cooling path port of the two cooling path ports in a summer ventilation position of the switching element.

2. The directional control valve according to claim 1, wherein the switching element is disc shaped and includes cut outs, and
wherein the air ports are connected with the heating path ports and the cooling path ports through the cut outs.

3. The directional control valve according to claim 2, wherein the switching element is pivotable about an axis arranged in the directional control valve.

4. The directional control valve according to claim 3, wherein cut outs towards the exhaust air port and the feed air port are arranged in a first circular ring and the outside air port and the waste air port are arranged in a second circular ring radially offset from the first circular ring, or
wherein cut outs towards the heating path ports are arranged in a first circular ring and cutouts towards the cooling path ports are arranged in a second circular ring about the axis that are radially offset from each other.

5. The directional control valve according to claim 1, further comprising: an electrical drive for the switching element.

6. The directional control valve according to claim 5, further comprising: a control for the electrical drive.

7. A device configured to control a temperature of an interior space of a building, the device comprising:
a heat pump; and
the directional control valve according to claim 1, wherein the heat pump is arranged in the cooling path and absorbs heat from the cooling path.

8. The device according to claim 7, further comprising:
a heat accumulator,
wherein the heat pump charges the heat accumulator, and
wherein the heat pump or the heat accumulator transfer heat to the heating path.

\* \* \* \* \*